(12) United States Patent
Hong

(10) Patent No.: US 7,050,047 B2
(45) Date of Patent: May 23, 2006

(54) SIGNAL LINE OF TOUCH PANEL DISPLAY DEVICE AND METHOD OF FORMING THE SAME

(75) Inventor: Hee Jung Hong, Seoul (KR)

(73) Assignee: LG Philips LCD Co., Ltd., Seoul (KR)

( * ) Notice: Subject to any disclaimer, the term of this patent is extended or adjusted under 35 U.S.C. 154(b) by 445 days.

(21) Appl. No.: 10/319,632

(22) Filed: Dec. 16, 2002

(65) Prior Publication Data
US 2003/0112227 A1 Jun. 19, 2003

(30) Foreign Application Priority Data
Dec. 17, 2001 (KR) .............................. 2001-79929

(51) Int. Cl.
*G09G 5/00* (2006.01)
(52) U.S. Cl. ................... 345/173; 345/179; 178/18.01; 178/18.06
(58) Field of Classification Search ........ 345/173–179; 178/18.01, 18.02, 18.05, 18.06
See application file for complete search history.

(56) References Cited

U.S. PATENT DOCUMENTS

| | | | |
|---|---|---|---|
| 5,062,198 A * | 11/1991 | Sun | 29/622 |
| 5,228,562 A | 7/1993 | Burk | |
| 5,518,078 A * | 5/1996 | Tsujioka et al. | 178/18.05 |
| 5,854,881 A * | 12/1998 | Yoshida et al. | 345/104 |
| 6,380,497 B1 * | 4/2002 | Hashimoto et al. | 200/5 A |
| 6,433,841 B1 * | 8/2002 | Murade et al. | 349/43 |
| 6,541,913 B1 * | 4/2003 | Mori et al. | 313/582 |
| 2002/0000979 A1 * | 1/2002 | Furuhashi et al. | 345/173 |
| 2003/0043122 A1 * | 3/2003 | Suzuki | 345/173 |

FOREIGN PATENT DOCUMENTS

| | | |
|---|---|---|
| JP | 08-241160 | 9/1996 |
| JP | 11-219259 | 10/1999 |
| KR | 200 10094766 | 11/2001 |

\* cited by examiner

*Primary Examiner*—Amr A. Awad
*Assistant Examiner*—Motilewa Good-Johnson
(74) *Attorney, Agent, or Firm*—McKenna Long & Aldridge LLP

(57) ABSTRACT

A signal line of a touch panel display device includes an upper substrate having a first transparent conductive film, a lower substrate having a second transparent conductive film, the lower substrate positioned opposite to the upper substrate, a pair of first electrodes positioned along opposing edges of the upper substrate along a first direction where the first transparent film is formed, a pair of second electrodes positioned along opposing edges of the lower substrate along a second direction perpendicular to the first direction where the second transparent film is formed, and at least one signal line extending from a side portion of one of the pairs of first electrodes and the pairs of second electrodes to a side surface of the touch panel display device to transmit a signal to an external controller.

10 Claims, 4 Drawing Sheets

SIGNAL LINE OF TOUCH PANEL DISPLAY DEVICE AND METHOD OF FORMING THE SAME

The present invention claims the benefit of Korean Patent Application No. P2001-79929 filed in Korea on Dec. 17, 2001, which is hereby incorporated by reference.

BACKGROUND OF THE INVENTION

1. Field of the Invention

The present invention relates to a display device, and more particularly to a signal line of a touch panel display device and method of forming the same.

2. Description of the Related Art

In general, a touch panel device is a computer peripheral that is commonly installed on a display surface of an image display device such as a cathode ray tube (CRT), a liquid crystal display (LCD), a field emission display (FED), a plasma display panel (PDP), and an electro-luminescence device (ELD) so that while looking at the image display device, a user applies pressure on the touch panel to enter predetermined information into the computer.

FIG. 1 is a perspective view of a touch panel display device and a liquid crystal display panel according to the related art. In FIG. 1, the touch panel display device includes a touch panel 2, a liquid crystal panel 1, and a backlight 3. The touch panel 2 is electrically connected to a computer system 5 via a touch controller 4 by signal lines. During operation of the touch panel display device, if a top of the touch panel 2 is contacted with more than a specific pressure, a voltage value of the contact position is calculated by the touch controller 4, thereby calculating coordinates of the contact position.

FIG. 2 is a cross sectional view of the touch panel display device and the liquid crystal display panel of FIG. 1 according to the related art. In FIG. 2, a liquid crystal display panel 1 is located between an upper polarized sheet 4A and a lower polarized sheet 4B, and the touch panel 2 is placed on the upper polarized sheet 4A. The liquid crystal panel 1 includes liquid crystal material 14 and a ball spacer 5 interposed between a lower glass substrate 3A and an upper glass substrate 3B. A gate line 6, an insulation film 8, a pixel electrode 10A, and a first alignment film 12A are sequentially formed on the lower glass substrate 3A. The upper glass substrate 3B has a black matrix 16, a color filter 18, a common electrode 17, and a second alignment film 12B sequentially formed on a bottom surface thereof. The ball spacer 5 is sprayed on a first alignment film 12A before the upper glass substrate 3B is bonded with the lower glass substrate 3A. The upper glass substrate 3B and the lower glass substrate 3A are separated by the ball spacer 5 to be maintained with a specific gap. That is, the spacer 5 uniformly maintains the gap between the upper glass substrate 3B and the lower glass substrate 3A, thereby maintaining a uniform thickness of the liquid crystal material 14.

The touch panel 2 includes a spacer 28 formed between a lower substrate 20 and an upper substrate 24. A first electrode layer 26 is formed on the surface of the lower substrate 20, and a second electrode layer 27 is formed on a bottom surface of the upper substrate 24. The second electrode layer 27 is electrically shorted with the first electrode layer 26 when the upper substrate 24 is pressed with a stylus pen or a finger, to generate a current or voltage level signal that changes in accordance with the pressed position. Accordingly, the first electrode layer 26 and the second electrode layer 27 are formed by printing silver Ag on transparent conductive material that has good transmittance, and has a low resistance. For example, the first electrode layer 26 and the second electrode layer 27 include indium-tin-oxide ITO, indium-zinc-oxide IZO, and indium-tin-zinc-oxide ITZO.

FIG. 3 is a plan view of an electrode and a signal line of the touch panel display device of FIG. 2 according to the related art. In FIG. 3, an upper plate of the touch panel 2 includes X-axis electrodes 27A and 27B formed along an edge thereof along a vertical direction, and signal lines 28C and 28D are derived from a center of the X-axis electrodes 27A and 27B for supplying the current or voltage level signal to the touch controller 4. In addition, a lower plate of the touch panel 2 includes Y-axis electrodes 26A and 26B formed along an edge thereof a long a horizontal direction, and signal lines 28A and 28B are derived from a center of the Y-axis electrode 26A and 26B for supplying the current or voltage level signal to the touch controller 34.

FIG. 4 is a perspective view of two separate substrates of the touch panel display device of FIG. 3 according to the related art. In FIG. 4, the signal lines 28A, 28B, 28C, and 28D include a tail part 29 and an electrode extension connected to the electrodes 26A, 26B, 27A, and 27B. If the two substrates are bonded together as above, then the electrodes 26A, 26B, 27A, and 27B, and the signal lines 28A, 28B, 28C, and 28D are arranged together.

However, in the event of extending the signal lines 28A, 28B, 28C, and 28D to one side of the touch panel 2, one or more signal lines are formed in the four directions of the touch panel 2 like A, B, C, and D of FIG. 3. Accordingly, the touch panel 2 needs a space for the signal lines to be laid besides a display area surrounded by the electrodes 28A, 28B, 28C, and 28D. Thus, there are problems in that the pattern forming the signal lines of the touch panel lessens the efficiency in using the substrate, thereby increasing costs and the overall size of the applied system.

SUMMARY OF THE INVENTION

Accordingly, the present invention is directed to a signal line of a touch panel display device and method of forming the same that substantially obviates one or more of the problems due to limitations and disadvantages of the related art.

An object of the present invention is to provide a signal line of a touch panel display device that forms a signal line connected to an electrode of a touch panel using a side portion of the electrode.

Another object of the present invention is to provide a method of forming a signal line of a touch panel display device that forms a signal line connected to an electrode of a touch panel using a side portion of the electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a signal line of a touch panel display device includes an upper substrate having a first transparent conductive film, a lower substrate having a second transparent conductive film, the lower substrate positioned opposite to the upper substrate, a pair of first electrodes positioned along opposing edges of the upper substrate along a first direction where the first transparent conductive film is formed, a pair of second electrodes positioned along opposing edges of the lower substrate along a second direction perpendicular to the first direction where the second transparent conductive film is formed, and at least one signal line extending from a side portion of one of the pairs of first electrodes and the pairs of second electrodes to a side surface of the touch panel display device to transmit a signal to an external controller.

In another aspect, a method of forming a signal line of a touch panel includes forming an upper and a lower substrate of a first material, forming a first transparent conductive film on the upper substrate, forming a second transparent conductive film on the lower substrate, forming a pair of first electrodes along opposing edges of the upper substrate along a first direction where the first transparent conductive film is formed, forming a pair of second electrodes along opposing edges of the lower substrate along a second direction perpendicular to the first direction where the second transparent conductive film is formed, and forming at least one signal line to extend from a side portion of one of the pairs of first and second electrodes to a side surface of the touch panel to transmit a signal to an external controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
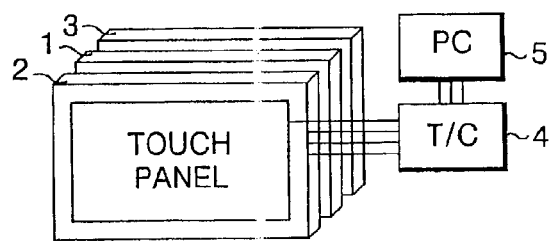
FIG. 1 is a perspective view of a touch panel display device and a liquid crystal display panel according to the related art.
Figure 2:
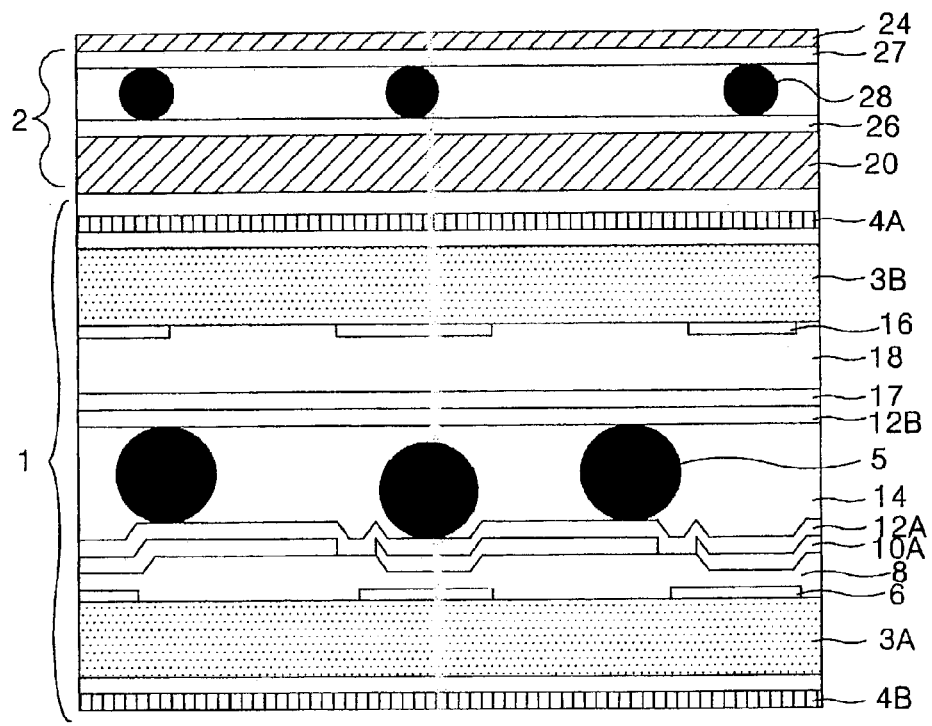
FIG. 2 is a cross sectional view of the touch panel display device and the liquid crystal display panel of FIG. 1 according to the related art.
Figure 3:
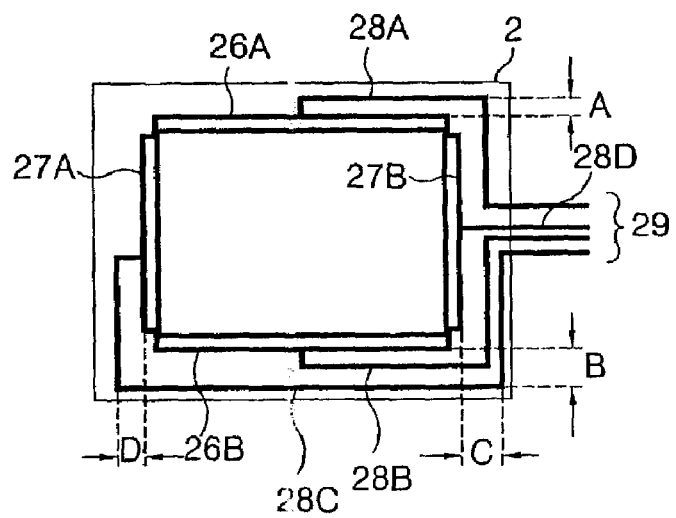
FIG. 3 is a plan view of an electrode and a signal line of the touch panel display device of FIG. 2 according to the related art.
Figure 4:
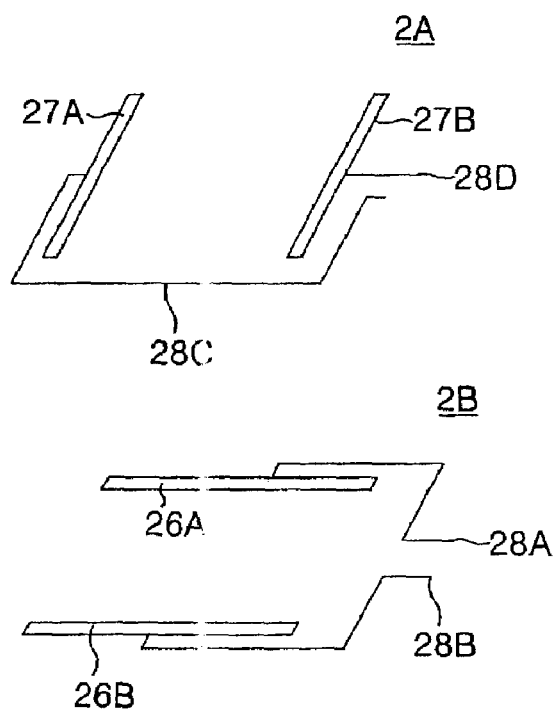
FIG. 4 is a perspective view of two separate substrates of the touch panel display device of FIG. 3 according to the related art.
Figure 5:
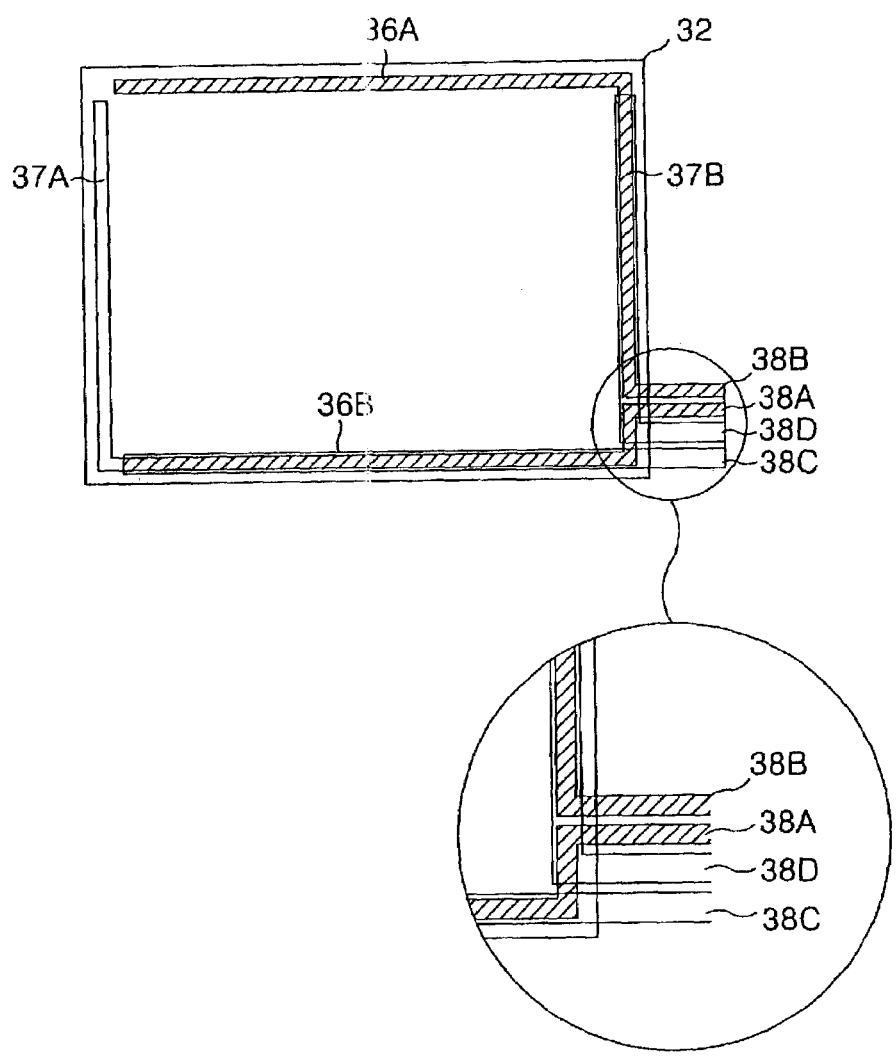
FIG. 5 is a plan view of an exemplary signal line of a touch panel display device according to the present invention.
Figure 6:
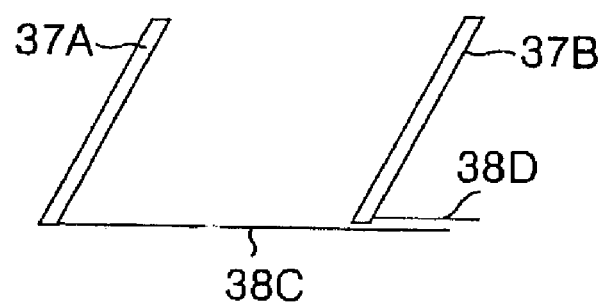
FIG. 6 is a perspective view of exemplary signal lines of a touch panel display device of FIG. 5 according to the present invention.
Figure 6:
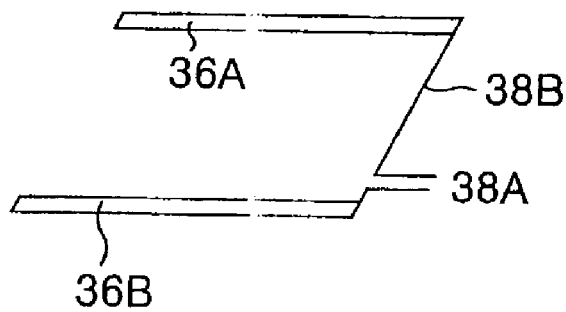

FIG. 5 is a plan view of an exemplary signal line of a touch panel display device according to the present invention, and FIG. 6 is a perspective view of exemplary signal lines of a touch panel display device of FIG. 5 according to the present invention. In FIG. 5, the touch panel display device may include a touch panel 32 having an upper substrate 32A (in FIG. 6) and a lower substrate 32B (in FIG. 6) formed of at least one of ITO and PET films, for example, and a spacer (not shown) may be sprayed between the upper and lower substrates 32A and 32B. In addition, the upper and lower substrates 32A and 32B may be formed by printing silver Ag on a transparent conductive material.

In FIG. 5, X-axis electrodes 37A and 37B may be formed along an edge of the upper substrate 32A along a vertical direction, and Y-electrodes 36A and 36B may be formed along an edge of the lower substrate 32B along a horizontal direction. Both the X-axis and Y-axis electrodes 37A, 37B, 36A, and 36B may include a silver material that may be deposited onto the upper and lower substrates 32A and 32B, respectively, using a printing process, for example, and a specific voltage may be applied between the X-axis and Y-axis electrodes 37A, 37B, 36A, and 36B. Accordingly, the X-axis electrodes 37A and 37B may form a first electrode layer, and the Y-axis electrodes 36A and 36B may form a second electrode layer. Thus, since the first electrode layer that includes the X-axis electrodes 37A and 37B may be electrically shorted with the second electrode layer that includes the Y-axis electrodes 36A and 36B when a location of the upper substrate 32A is pressed with a stylus pen or a finger, the X-axis and Y-axis electrodes 37A, 37B, 36A, and 36B may generate a current and voltage level signal that may change in accordance with the pressed location. In addition, four signal lines 38A, 38B, 38C, and 38D may be electrically connected to the X-axis and Y-axis electrodes 37A, 37B, 36A, and 36B to supply the current and voltage level signals from the first and the second electrode layers to a touch controller (not shown) to calculate coordinates of the pressed location.

In FIG. 6, the signal lines 38A and 38B may be electrically connected to end portions of the Y-axis electrodes 36A and 36B, respectively, and the signal lines 38C and 38D may be electrically connected to end portions of the X-axis electrodes 37A and 37B, respectively. For example, the signal lines 38A and 38B may be electrically connected to adjacent end portions of the Y-axis electrodes 36A and 36B, wherein the signal lines 38A and 38B are positioned to extend along a direction parallel to a direction of the Y-axis electrodes 36A and 36B. The signal lines 38C and 38D may be electrically connected to adjacent end portions of the X-axis electrodes 37A and 37B, wherein the signal lines 38C and 38D are positioned to extend along a direction perpendicular to a direction of the X-axis electrodes 37A and 37B. Accordingly, as shown in FIG. 5, when the upper and lower substrates 32A and 32B are bonded together the signal lines 38A, 38B, 38C, and 38D are adjacent to each other and extend from the bonded upper and lower substrates 32A and 32B along the direction of the Y-axis electrodes 36A and 36B. In addition, as shown in FIG. 5, the signal lines 38C and 38D electrically connected to the X-axis electrodes 37A and 37B and the signal lines 38A and 38B electrically connected to the Y-axis electrodes 36A and 36B cross over each other. Thus, the positioning of the signal lines 38A, 38B, 38C, and 38D reduces an overall size of the touch panel display device.

It will be apparent to those skilled in the art that various modification and variations can be made in the signal line of a touch panel display device and a method of forming a signal line of a touch panel display device of the present invention without departing from the spirit or scope of the invention. Thus, it is intended that the present invention cover the modifications and variations provided they come within the scope of the appended claims and their equivalents.

What is claimed is:

1. A signal line of a touch panel display device, comprising:
- an upper substrate have a first transparent conductive film;
- a lower substrate having a second transparent conductive film, the lower substrate positioned opposite to the upper substrate;
- a pair of first electrodes positioned along opposing edges of the upper substrate along a first direction where the first transparent conductive film is formed;
- a pair of second electrodes positioned along opposing edges of the lower substrate along a second direction perpendicular to the first direction where the second transparent conductive film is formed;
- an output area at an edge of the display device;
- a first signal line connected to one of the pair of first electrodes in the output area, and a second signal line connected to the other of the pair of first electrodes; and
- a third signal line connected to one of the pair of second electrodes, and a fourth signal line connected to the other of the pair of second electrodes;
- wherein the second signal line substantially overlaps one of the pair of second electrodes; and
- wherein the third signal line substantially overlaps one of the pair of first electrodes.

2. The device according to claim 1, wherein the first, second, third, and fourth signal lines extend to the output area.

3. The device according to claim 1, further including an insulation film between the upper and lower substrates where the pairs of first electrodes and the pairs of second electrodes are formed.

4. The device according to claim 1, wherein the at least one signal line extends along one of the first and second directions.

5. The device according to claim 1, wherein the upper and lower substrates both include at least one of indium-tin-oxide and polyethylene terephthalate.

6. A method of forming a signal line of a touch panel, comprising steps of:
- forming an upper and a lower substrate of a first material;
- forming a first transparent conductive film on the upper substrate;
- forming a second transparent conductive film on the lower substrate;
- forming a pair of first electrodes along opposing edges of the upper substrate along a first direction where the first transparent film is formed;
- forming a pair of second electrodes along opposing edges of the lower substrate along a second direction perpendicular to the first direction where the second transparent conductive film is formed;
- defining an output are at an edge of the display device;
- forming a first signal line connected to one of the pair of first electrodes in the output area, and forming a second signal line connected to the other of the pair of first electrodes; and
- forming a third signal line connected to one of the pair of second electrodes and forming a fourth signal line connected to the other of the pair of second electrodes;
- wherein the second signal line substantially overlaps one of the pair of second electrodes; and
- wherein the third signal line substantially overlaps one of the pair of first electrodes.

7. The method according to claim 6, the first, second, third, and fourth signal lines extend to the output area.

8. The method according to claim 6, further comprising a step of forming an insulation film between the upper and lower substrate where the pairs of first and second electrodes are formed.

9. The method according to claim 6, wherein the at least one signal line extends along one of the first and second directions.

10. The method according to claim 6, wherein the first material of the upper and lower substrates includes at least one of indium-tin-oxide and polyethylene terephthalate.

* * * * *